United States Patent [19]

Fross

[11] 4,112,060
[45] Sep. 5, 1978

[54] METHOD FOR THE PRODUCTION OF CARBON BLACK FROM LIQUID OR GASEOUS HYDROCARBONS

[75] Inventor: Arthur E. Fross, Basel, Switzerland

[73] Assignee: Etablissement Gelan, Vaduz, Liechtenstein

[21] Appl. No.: 686,324

[22] Filed: May 14, 1976

Related U.S. Application Data

[63] Continuation of Ser. No. 412,599, Nov. 5, 1973, abandoned.

[30] Foreign Application Priority Data

Nov. 10, 1972 [CH] Switzerland .................. 16415/72
Aug. 31, 1973 [CH] Switzerland .................. 12537/73

[51] Int. Cl.² .................. C01B 31/02; C09C 1/48
[52] U.S. Cl. .................. 423/450; 423/454; 423/458
[58] Field of Search .................. 423/450–458

[56] References Cited

U.S. PATENT DOCUMENTS

| | | | |
|---|---|---|---|
| 1,738,716 | 12/1929 | Matlock | 423/458 |
| 2,144,738 | 4/1938 | Heller et al. | 423/458 |
| 2,144,971 | 1/1939 | Heller et al. | 423/458 |
| 2,375,797 | 5/1945 | Krejci | 423/456 |
| 2,375,798 | 5/1945 | Krejci | 423/458 |
| 2,499,438 | 3/1950 | Wiegand et al. | 423/455 |
| 2,623,811 | 12/1952 | Williams | 423/458 |
| 2,632,713 | 3/1953 | Krejci | 423/458 |
| 2,641,534 | 6/1953 | Krejci | 423/456 |
| 2,643,182 | 6/1953 | Williams | 423/458 |
| 2,781,246 | 2/1957 | Coldtrap | 423/450 |
| 2,895,804 | 7/1959 | Heller | 423/456 |
| 3,003,854 | 10/1961 | Heller | 423/450 |
| 3,132,926 | 5/1964 | Ruble | 423/450 |
| 3,342,556 | 9/1967 | Ruble | 423/450 |
| 3,355,247 | 11/1967 | Krecji et al. | 423/450 |
| 3,369,870 | 2/1968 | Ganz et al. | 423/450 |
| 3,467,502 | 9/1969 | Davis | 423/458 |
| 3,867,513 | 2/1975 | Krejci | 423/456 |

*Primary Examiner*—O. R. Vertiz
*Assistant Examiner*—Gary P. Straub
*Attorney, Agent, or Firm*—Flynn & Frishauf

[57] ABSTRACT

The hydrocarbon material to be decomposed and the combustion-supporting gas, such as air, are conditioned before admission to the reaction chamber to provide formation of carbon black under conditions highly controllable as to output product properties, particularly with reference to the hydrocarbon-air ratio. The air is conditioned by pre-heating in a heat exchanger, liquid hydrocarbon raw material is conditioned by pre-heating, pressurizing, pressure regulation, flow rate regulation and, finally, spray atomizing in ante-chambers distributed across the cross section of the combustion chamber and housed in a removable header on the intake side of the reaction chamber, whereas gaseous hydrocarbon raw material is conditioned for the process by control-mixing, pre-heating and diffusion in the aforesaid ante-chambers. A gas-fueled heater is provided for preliminary warming up of the reaction chamber to a temperature sufficiently high for partial combustion of the reagents. The reaction chamber exit connects through a short transition section with expansion relief valves to a smoke cooler and then directly to a heat exchanger for pre-heating the combustion air from which the reaction products proceed to a cyclone separator followed by a filter separator. A damper in the exit stack controls the somewhat sub-atmospheric pressure in the reaction chamber in cooperation with the controls for the rate of supply of the inputs. The reaction product temperature does not exceed 1200° C.

18 Claims, 4 Drawing Figures

METHOD FOR THE PRODUCTION OF CARBON BLACK FROM LIQUID OR GASEOUS HYDROCARBONS

This is a continuation of application Ser. No. 412,599, filed Nov. 5, 1973 now abandoned.

The present invention relates to a method and to apparatus for production of carbon black from liquid and/or gaseous hydrocarbon raw materials in the presence of an oxygen-containing gas, especially air, by thermal decomposition during partial combustion of the hydrocarbons in a reaction chamber.

Methods for production of carbon black from liquid and gaseous hydrocarbons are known. In the production of carbon black from normally liquid hydrocarbons, all the known methods and the related apparatus involve the incomplete combustion of hydrocarbon-containing material with air in a thermally insulated or plain vessel, where a portion of the hydrocarbons are burned and the remainder cracked by the heat of combustion thus developed. In all known methods the heating or fuel gas, for example natural gas, propane, a petroleum distillate vapor, or the like, must be added with a sufficient amount of a gas containing free oxygen, normally air, and burned in a reactor, and the normally liquid starting product for the production of carbon black is sprayed into the flames or into their combustion products. Usually more than the amount of air necessary for the complete combustion of the heating gas is supplied to the carbon black oven, as a result of which, however, only a very small portion of the liquid hydrocarbon is burned along with the heating gas. Moreover, in the production of carbon black by these methods, a part of the product appears in the form of carbon grit which must then be separately ground.

All the known production methods operate at very high temperatures, in the range above 1300° C. The reaction in the reaction chamber, the combustion system and the operating conditions affecting the carbon black quality involve factors difficult to control. In addition, the carbon black produced must still be quenched with a continuous water jet.

The apparatus used in the known carbon black production methods consist of completely metallic or more or less horizontal reactors in which the pyrolysis is carried out in metallic reaction tubes provided with a heat conducting fire-proof coating or else in uncoated tubes, or else they consist of a first oven cylinder having a diameter greater than its length, to which a second cylinder is connected in the axial direction.

In the known methods of producing carbon black from gaseous hydrocarbons the reaction of the gas mixture takes place in relatively small containers with a capacity of at most 10 liters, in which the gas mixture is cyclically admitted through an intake valve and from which the reaction products are cyclically discharged after the reaction through an exhaust valve. A very low yield per chamber filling is obtained for each reaction, as a result of which the economics of this method are unsatisfactory. Furthermore, in the known methods it is necessary to operate with supplements of liquid hydrocarbons or with other easily ignited raw materials.

Another method, known as the channel process is known, in which natural gas is burned in thousands of small flames in a "hothouse." The oxygen requirement for the maintenence of combustion is met by supplying air. The little flames are slowly moved back and forth in steel channels, while the carbon black is scaped off fixed steel plates and falls into a conveyor bucket by which it is taken to a carbon grit separator. The carbon black is blown through the separator, where the heavy particles (grit) are separated. There is in this procedure the disadvantage that the carbon black yield is very low, i.e. not higher than 5% of the input carbon content, and the products made by this process, particularly pigment grade carbon black, are accordingly very costly.

It is an object of the present invention to provide a method and an apparatus for the production of carbon black which are not subject to the disadvantages of the known apparatus but will make possible the production of carbon black at high yield in a wide variety of carbon black types with the use of the same equipment.

SUBJECT MATTER OF THE PRESENT INVENTION

Briefly, the hydrocarbons and the oxygen-containing gas are preconditioned before their admission to a hot reaction chamber and are introduced in the reaction zone in a hot homogeneous gaseous state produced by passage through antechambers where they are subject ot heating by heat radiated thereinto from the reaction chamber. The partial combustion reaction that produces the formation of carbon black is the main source of heat to maintain the reaction temperature, only a small amount of heat being added, and sometimes being removed, to improve the regulation of the reaction temperature, preferably by indirect heat exchange with a coil in which a circulating heat exchange medium is caused to flow. The resulting reaction products are cooled and then separated.

The apparatus for carrying out the process is characterized by the fact that the reaction chamber, which may have a vertical or a horizontal axis, has a wall on the entry end, on the inner side of which a plurality of antechambers their axes parallel to the reaction chamber axis are provided that are distributed over the reaction chamber cross section and, furthermore, that on the output side of the reaction chamber there are provided a cooler for the reaction products, a pre-heater for the combustion supporting gas and thereafter a separator apparatus for separating the carbon black.

The invention is further described by way of example with reference to the annexed drawings, in which.

Figure 1:
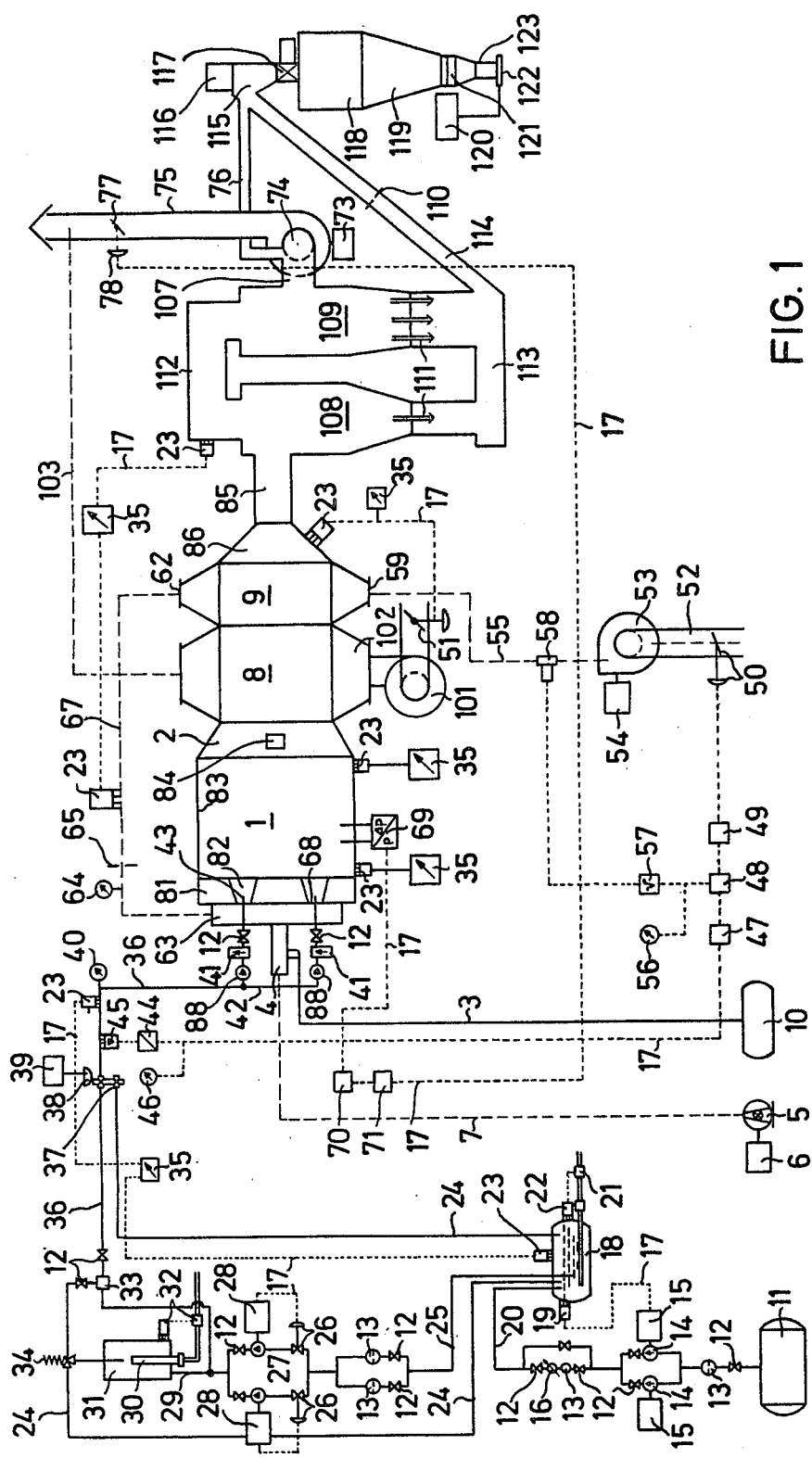
FIG. 1 is an operation diagram of a complete installation for the production of carbon black.

In FIG. 1, piping for liquid hydrocarbon transfer, which may be referred to for short as "oil piping", is shown in solid lines, while dashed lines indicate air piping and ducts and dotted lines indicate control lines 17. Temperature sensors are designated by the reference numeral 23, temperature indicators by 35, and shut-off valves by 12.

In the system of FIG. 1, the hydrocarbon such as heavy petroleum oil, for example, and an oxygen-containing gas such as air are used for the production of carbon black. There is a reaction chamber 1 provided with a header 81 covering the intake side and incorporating the head wall at the entry side of the reaction chamber and its input arrangements, as more particularly shown in FIG. 3. The reaction chamber and its header are warmed up to enable the reaction to be started by a warm up burner 4 provided in the combustion chamber wall structure or in the header 81. The warm up burner 4 is supplied with fuel gas, for example propane, from a gas tank 10 over a supply pipe 3 and is supplied with air to support combustion over piping 7 from an air blower 5 driven by an electric motor 6. The spent gases of the warm up burner 4 flow into the reaction chamber 1.

The arrangements for introduction of the reagents into the combustion chamber are described farther below.

From the reaction chamber all combustion products pass over a transition section 2 with expansion flap valves 84 into a cooler 8 and into an air pre-heater 9. After the leaving the latter, the combustion products, which may be referred to as spent gas or smoke gas, proceed through a gathering funnel or cone 86 and a connection duct 85 into a carbon black separator 108, 109 and from there into a chimney 75. Depending upon the design and construction of the chimney 75 it may be necessary to provide a suction blower 74 driven by an electric motor 73 ahead of the chimney 75, as shown in FIG. 1.

Equipment for the conditioning of the heavy oil, shown at the left of FIG. 1, includes a storage tank 11 which is connected over a practically pressureless supply pipe 20 with a pre-heating input tank 18. Interposed in the supply line 20 are shut-off valves 12, filters 13, two rotary pumps 14 (one as stand-by) each driven by a motor 15, and a measuring device 16 provided with a bypass. At the input tank 18 a level sensitive switch 19 is provided which is connected with the motor 15 of the rotary pump 14 over a control line 17.

A heating element equipped with a thermostat 21 is provided in the input tank 18, as well as a temperature regulator 22 (for regulating the temperature to about 40° C.) and a temperature sensor 23 connected to a temperature indicating device 35.

A conduit 25 leads from the input tank 18 over regulating valves 26, of which one is in stand-by service to a pair of pressure pumps 27, of which again one is for stand-by, each driven by an electric motor 28, to provide a pressure of about 30 atm. The pressure line 29 leads to a pass-through heater 31 provided with a heating element 30 and controlled by a thermostat 32 and a temperature regulator 33. The heavy oil, heated to about 130° C., goes from the heater 31 to a pressure regulator 34 from which there is a return line 24 to the input tank 18 and an output pressure line 36 to the distribution pipes 42 for a number of injection nozzles 43 of which two are shown in FIG. 1. The quantity of oil flowing to the spray nozzles 43 is regulated by a quantity regulator that comprises a return line 37, an input quantity regulator 38 and a control or motor 39. An oil injection pressure gauge 40 and a temperature sensor 23 are provided in the pressure line 36, the measurements of which are displayed in an indicator device 35. In each of the individual lines feeding the spray nozzles 43 a flow monitor 41 and a shut-off valve are provided.

The rate of feed of the heavy oil to the spray nozzles 43, which may for example be 800 kg/h, is measured by a rotary piston counter 45, the output signal of which is converted to a pneumatic signal by a transmitter 44. This pneumatic signal is supplied to the indicator device 46 to display the rate of feed to the spray nozzles 43 and is also supplied to the ratio relay 47 for adjustment of the air-oil ratio, to an air ratio regulator 48 and to a pneumatic range regulator 49.

The combustion air is delivered by a blower 53 driven by an electric motor 54. A damper valve with a pneumatic drive 50 regulated by the range regulator 49 is provided for control of the suction intake 52 of the blower 53. In the pressure duct 55 following the blower 53 a measuring diaphragm 58 is provided where a pressure difference is measured from which a pneumatic computing relay 57 computes the air feed rate (about 3000 – 7000 Nm$^2$). An air feed rate indicator 56 displays the signal of the computing relay 57, which is also supplied to the ratio regulator 48. The pressure line 55 discharges into the intake manifold 59 of an air pre-heater 9 which heats the combustion air to about 300° C. The combustion air leaving the hot air exit 62 of the pre-heater 9 proceeds over a conduit 67 to an air distribution chamber 63 from which it is delivered to the ante-chambers 82 through openings 68. A pressure gauge 64 and a temperature sensor 23 are provided in the conduit 67. A temperature sensor signal is provided over a control line 17 to a temperature indicator 35 which also displays temperature sensed by another temperature sensor in the final separator 109. A measuring diaphragm 65 to measure the rate of air supply can be built into the pressure line 67.

The reaction chamber 1 is equipped with a further transmitter device 69 to provide a signal to a pneumatic underpressure-regulator 70 and an associate range control 71. More details regarding these instruments are given in Table IX below. The regulators 70 and 71 operate with reference to a desired value of pressure that is to be maintained, which can be manually set, for example an underpressure of a few millimeters of water, and supply a signal indicating the detected deviation from this desired value, which then operates the pneumatic drive setting the position of the regulating damper 77 in the chimney 75 in order to correct the pressure deviation measured.

The chimney 75 discharges the residual gases coming out of the carbon black separator installation designated by the reference numerals 108 through 123, so that the regulation of the damper 77 just described maintains the regulated underpressure in the reaction chamber 1 and in the portions of the installation in communication with it.

Two temperature sensors 23 and two temperature indicators 35 are provided on the reaction chamber that is constructed with a removable cover in the form of the header 81 in which the ante-chambers 82 are built in. The cylindrical reaction chamber wall 83 has a tapered transition on its exit side which is provided by the transition section 2, to which is connected the air cooler 8 that serves to cool the reacton products that enter it at a temperature that has a maximum value of 1200° C. The cooled reaction products go immediately from the air cooler to the cooling of the pre-heater 9 that operates as a heat exchanger, cooling the reaction products and warming the air supplied to support combustion.

The reaction products are at about 300° C. when they reach the duct 85 leading to the cyclone-type preliminary carbon black separator 108 in which a certain quantity of carbon black is separated and which can consist of a number of cyclone units. The remaining reaction products are led by a connection duct 112, at a temperature of about 250 ° C. measured at the duct input by a temperature sensor 23, to a final carbon black separator 109 of the filter type where all of the remaining carbon black is separated from the other reaction products. The residual gas proceeds through a suction intake 107 to the suction blower 74 and thence into the chimney 75. The carbon black separated in the separators 108 and 109 drops through carbon black exit openings 111 into a horizontal carbon black conveyor 113, from which it is delivered to an inclined lifting conveyor 114 in which there is built in a carbon black compression device 110, for example a hinged flap provided with a weight to produce a compression effect, until the carbon black reaches the upper end of a collecting hopper 118 provided with a gathering cone 119. Above the collecting hopper 118 is a vane-type charging valve 117 for the carbon black controlled by an electric motor 116 into which the carbon black is delivered through a guiding vessel 115. Below the collecting cone 119 a filling device 121 for the carbon black is provided which is equipped with a carbon black scale 120, a scale platform 122 and a packing vessel 123.

In order to make possible the initial warming-up of the portions 111, 113 and 114 of the carbon black conveyor, a connecting duct 76 equipped with a shut-off damper (not shown) is arranged between the guiding vessel 115 and the suction intake 107 of the suction blower 74. When the damper of the duct 76 is opened, the spent gases are caused to circulate through the lower portions as well as the upper portions of the separating apparatus, and this mode of operation is used during the preliminary heating of the reaction chamber to warm up the conveyor units.

Figure 2:
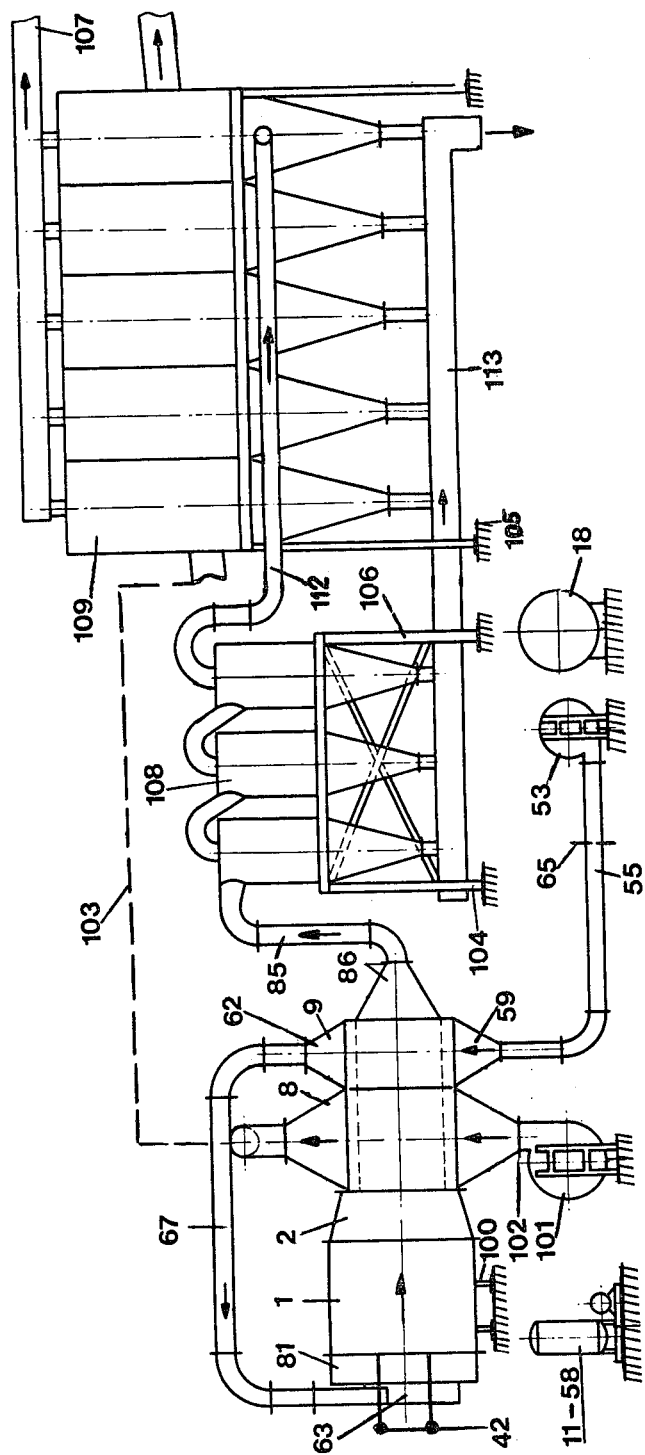
FIG. 2 is a schematic representation of an installation according to FIG. 1, showing its principal components.

FIG. 2 shows an arrangement of the installation more diagrammatically shown in FIG. 1. In this Figure, as is the case also in FIG. 3, the same reference numerals are accordingly used for the same component elements.

The component equipments of the installation are supported on a foundation or other prepared site 105 by struts 100, 104 and 106, while the blowers 53 and 101, the input tank 18 and the pre-conditioning equipment 11 – 58 for the heavy oil raw material are conveniently located in a basement below the other equipment. The central operation and control equipment is not shown in FIG. 2 and it may conveniently be provided in a separate or remote location.

The blower 101 serves for the cooling of the reaction product gases that may simply be referred to as the smoke gases. The blower 101 is directly connected to the input manifold 102 of the smoke cooler 8. The air thereby warmed is led over a duct 103 to the chimney 75. The cold air output of the blower 101 is regulated by a throttle valve 51 as a function of the temperature measured at the output funnel cone 86 by a temperature sensor 23 in such a way that the smoke enters the combustion air pre-heater at a sufficiently high temperature and leaves the latter at a predetermined temperature.

Figure 3:
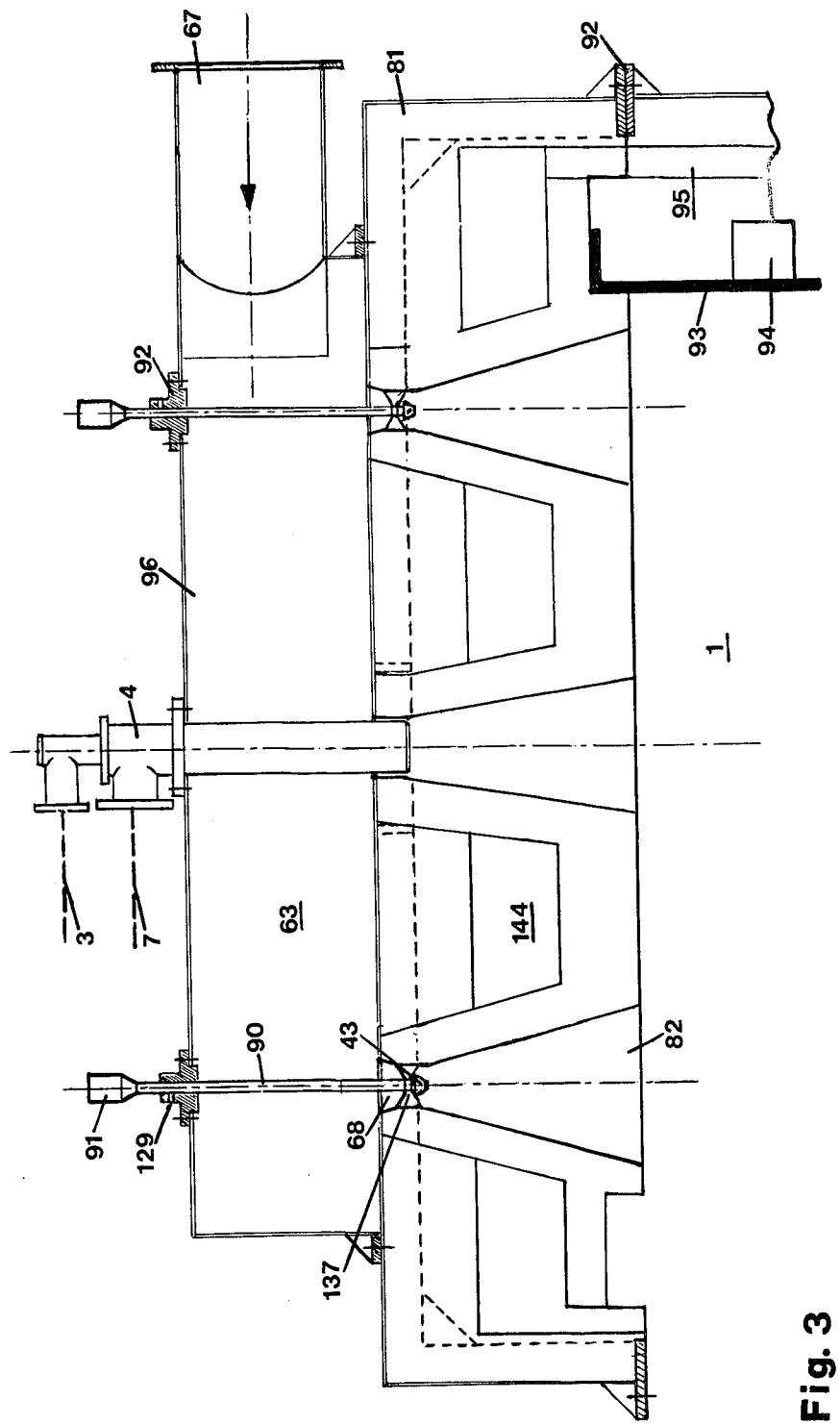
FIG. 3 is a cross section through the header of the combustion chamber of the system of FIG. 1.

FIG. 3 shows the header 81 of the reaction chamber 1 with the air distribution chamber 63 mounted thereon. Centrally located in this assembly is the final preliminary warm-up with which the fuel and air lines 3 and 7 are connected. The spray nozzles 43, associated with the ante-chambers 82, are uniformly distributed over the entire cross section of the combustion chamber 1. The injection nozzles 43 are affixed to retractable tubes 90, at the other end of each of which is provided a positioning coupling 91 with which a piece of flexible tubing (not shown) connects to provide the necessary connection to the supply distribution pipe 42.

Flange-like holders 92 are provided on the cover of the air distributing chamber 63 for holding the tubes 90 so as to make possible retraction of the tubes 90 with their spray nozzles 43 as well as to hold them fast in any desired position with the help of set screws 129. The components provided in the tubes 90 shown in FIG. 1 — shut-off valve 12, flow monitor 41 and a pump 88 — are omitted in FIG. 3 for reasons of simplification. A distributing apparatus 137 which may be referred to as a diffuser is adjustably mounted in the neighborhood of the injection nozzle 43.

Flaring ante-chambers 82 are built into the header 81 with suitable ceramic construction materials indicated at 144. The length of the ante-chambers 82 is sufficient for a complete vaporization of the hydrocarbon material. The header 81 is provided with a header flange 92 by which it is bolted onto the cylindrical portion of the reaction chamber 1. The latter has a cylindrical wall 93 made of heat resistant metal sheet or plate. It is practical to provide the metal envelope 93 of the reaction chamber with a cooling and heating coil 94, of which one winding is shown in FIG. 3. In addition, it is desirable to coat the exterior of the metal wall 93 with an insulating layer or body 95.

Figure 4:
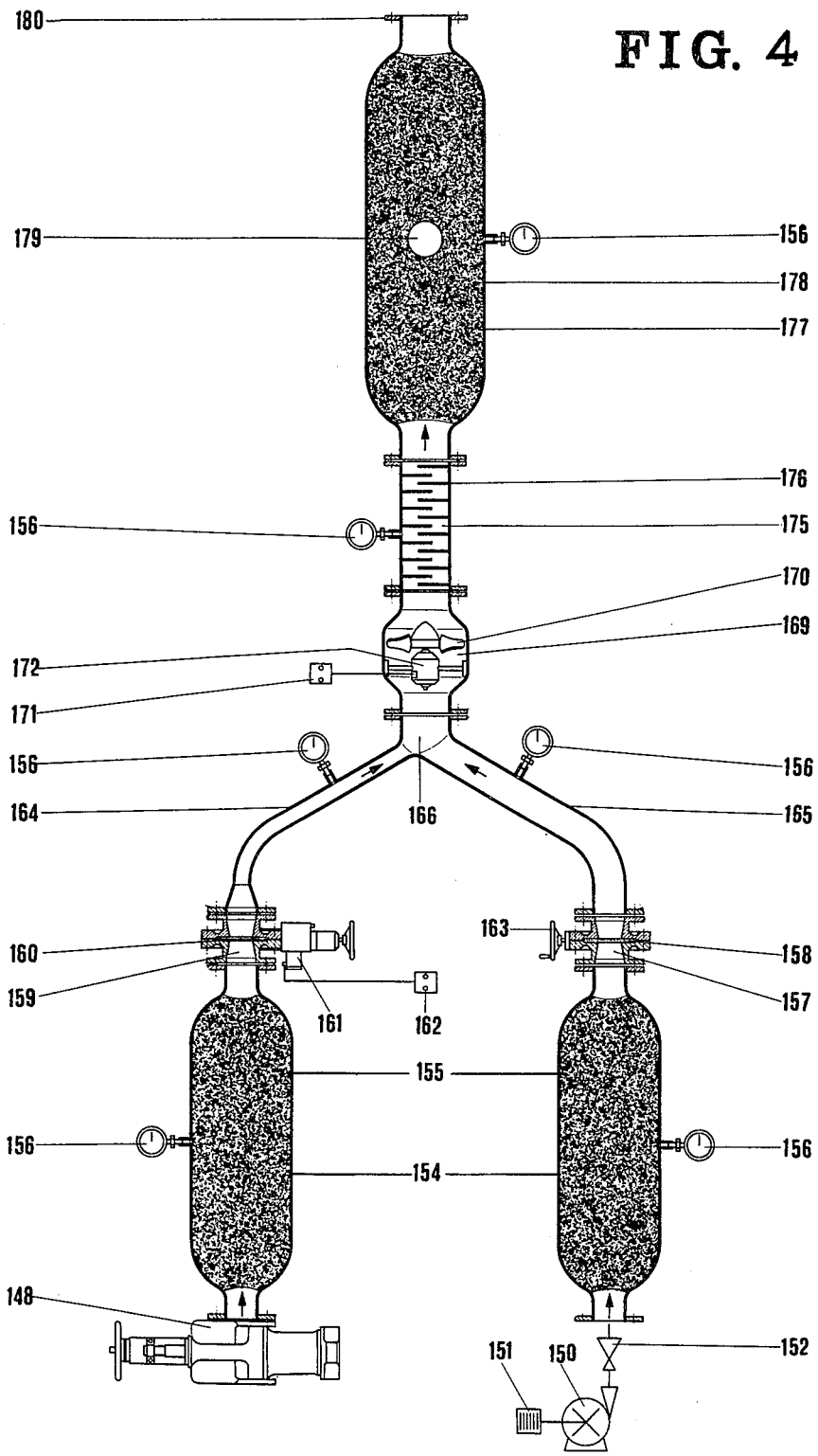
FIg. 4 is a cross section of a mixing apparatus for the mixing of gaseous hydrocarbons with an oxygen-containing gas.

If the installation described with reference to FIG. 1 and FIG. 2 is operated with gaseous hydrocarbons as raw material, the components 11 – 58 are not needed. At the pre-heater intake manifold 59 a mixing equipment as shown in FIG. 4 is then connected by means of a flange 180. At the location 166 of the mixing equipment, there come together two tube conduits, one of which supplies gaseous hydrocarbons provided over a pressure reducing valve 148, an equalization vessel 154 filled with a suitable packing material 155, for example rust-free steel wool, a diaphragm gate valve 159 with an adjustable diaphragm 160 and an electric drive 161 controlled by a switch 162 and, finally, a restricted conduit 164. The other conduit 165 leading to the location 166 supplies combustion air from a blower 150 driven by an electric motor 151, through a pressure-reducing valve 152, an equalization vessel 154 filled with a suitable packing material 155, a diaphragm gate valve 157 with an adjustable diaphragm 158 controlled by a hand drive 163 and, finally, a broadened tube section 165.

At the junction 166 of the tubes 164 and 165 a mixing suction blower 169 provided with a ventilator 170, a multi-stage switch 171 and a multi-stage electric motor 172 is arranged to feed the mixture into the homogenizing path 175 equipped with perforated vanes or partitions 176. On the exit side of the homogenizing unit 175 is provided a check vessel 177 for counteracting back-pressure, provided with a filling 178 of a suitable packing material and an expansion safety valve 179. Control manometers 156 are provided at various locations of the mixing equipment.

In the mixing equipment constructed in accordance with FIG. 4, the diaphragm gate valve 159 for the gaseous hydrocarbon material can operate independently of the diaphragm gate valve for the air supply and each can be adjusted and regulated individually for the desired flow rate. The tubing sections 164 and 165 have greatly differing cross sections as a consequence of the desired mixing ratios, which for example may be one part gaseous hydrocarbon to four to six parts air, according to the desired carbon black quality. At the location 166 the formation of the mixture takes place which becomes fully mixed in the homogenizing path 175 that follows the blower 169. In order to assure a constant mixing ratio it is practical to hold constant the pressure ahead of the two diaphragm gate valves. Either the gas or the air can be regulated by the adjustment of the regulating diaphragms so that every quality of carbon black can be produced. The optimum mixing ratio for each quality of carbon black can conveniently be determined by test runs.

The apparatus of FIG. 4 may be used either to mix the hydrocarbon gas with the air in the line 55 (FIG. 1) ahead of the first air pre-heater (heat exchanger 9) or for insertion in the line 65 to mix the gases after the first preheating of the air, but ahead of the distribution chamber 63.

The chemical basis for carbon black production using liquid and gaseous hydrocarbons as raw material is the decomposition of paraffinic hydrocarbons at high temperatures into their elementary components carbon and hydrogen. The reaction which already begins at 900° C. and increases in yield with increasing temperature, absorbs heat and goes to completion by the separation of carbon according to the following equations:

$$C_nH_m \rightarrow n\,C + (m/2)\,H_2\ (\Delta H\text{ endothermic}) \qquad (1)$$

For example, for $CH_4$:

$$CH_4 \rightarrow C + 2H_2\ (\Delta H = 17.87\text{ kcal}) \qquad (2)$$

In order to produce a continuous dropping out of carbon black resulting from thermal decomposition of liquid or gaseous hydrocarbons, the heat necessary for the reaction is provided directly to the reaction process by a partial combustion with air of the input hydrocarbons. Along with the decomposition reaction itself, then, a heat-liberating reaction takes place in accordance with the following equation:

$$C_nH_m + \text{air} \rightarrow x\,CO_2 + y\,CO + (m/2)\,H_2O\ (x + y = n)\ (\Delta H\text{ exothermic}) \qquad (3)$$

For example, for $CH_4$:

$$2CH_4 + 2.5\,O_2 + 10\,N_2 \rightarrow CO_2 + CO + 2H_2O + 10\,N_2\ (\Delta H = 201.2\text{ kcal}) \qquad (4)$$

At the same time a portion of the reagents combine according to the following equation:

$$CH_4 + H_2O \rightarrow CO + 3H_2. \qquad (5)$$

By control of the hydrocarbon-air ratio the overall reaction can be caused to run on an optimum basis, preferably between about 00° and 1200° C., and the quality of the carbon black dropping out of the reaction products can be controlled in a reproducible way. In this manner it is possible to produce carbon black of high value to different specifications with a yield of 10 to 85% using heavy oil or 10 to 35% using natural gas, in terms of percentage of carbon input. An appreciable quantity of a residual gas of good usability as a heating gas is formed as a byproduct.

It is important that both the hydrocarbons and the oxygen-containing gas should be delivered in exactly measured out quantities (rates) and conditioned for supply to the installation here described. The conditioning in this case is performed before and/or after entrance into the ante-chambers 82. In the system described in FIGS. 1 and 2 the heavy oil is warmed to about 125° C., measured out and put under pressure at about 25 atm., after which further conditioning is carried out, i.e., the atomizing and vaporizing in the ante-chambers 82.

Only a practically completely homogenized and gaseous mixture enters into the reaction zone of the furnace chamber 1.

In the case of gaseous hydrocarbons the conditioning is largely accomplished before introduction into the ante-chambers 82, whereas in the ante-chambers themselves a further warming of the mixture takes place, since the temperature in the ante-chambers 82 is above 600° C.

The mixing of the liquid hydrocarbons with the combustion air which has been conditioned (i.e. heated) in the air pre-heater 9 takes place in the ante-chambers 82 in the case of an installation according to FIG. 1, but in the disposition of the installation when operating with gaseous hydrocarbons as a starting material, this mixing takes place in the mixing apparatus according to FIG. 4.

The ante-chambers 82 which are important for carrying out the method of the invention are relatively small compared to the reaction chamber 1. It is desirable to distribute the ante-chambers 82 evenly over the cross section of the reaction chamber 1. The header 81 must accordingly have sufficient strength in the ceramic material 144 for housing the ante-chambers 82. An improvement of operation safety when liquid hydrocarbons are used as raw material is obtained if, as shown in FIG. 1, in each branch of the distributing piping 42, ahead of the flow monitor 41 there is provided a feed control pump 88 driven by one or more motor or motors (not shown). These will supply a quantity and rate of feed practically independent of the momentary pressure. If a partial blocking occurs in an injection nozzle 43 because of the presence of a foreign body, the pressure in the corresponding feed control pump 88 rises and the foreign body can thereby be expelled.

When feed control pumps 88 are used it is possible to lower the pressure in the pressure line 36.

There are given in the following tables observed data obtained in the manufacture of five types of carbon black produced from heavy oil in accordance with the present invention and also the characteristics of twelve different types of carbon black that may be produced in an installation according to the present invention.

TABLE I

| Analysis of the heavy petroleum raw material: | |
|---|---|
| Specific gravity at 20° C | = 1.078 |
| Carbon content in % | = 90.25 |
| Hydrogen content in % | = 8.11 |
| Sulfur content in % | = 1.40 |
| Oxide ashes in % by weight | = 0.016 |
| Flash point by Pensky-Martens test at ° C | = 153.0 |
| Water | = None |
| Color: dark-brown to black, viscous | = 180.0° C |

On the basis of the analysis results, the material was a very heavy residual oil.

Still further aromatic heavy oils of various compositions have been used.

TABLE II

| Process Conditions | |
|---|---|
| Oil spray injection pressure in atm. above 1 atm. | = 26.5 |
| Oil spray injection temperature in ° C | = 128.0 |
| Air intake temperature in ° C | = 195.0 |
| ante-chamber temperature in ° C | = 740.0 |
| Combustion chamber temperature in ° C | = 1050.0 |

TABLE III

Test results for carbon in synthetic rubber

| "FROSSRUSS" types of black: | Vulcanizing time in Min. | | Type-150 | Type-250 |
|---|---|---|---|---|
| iodine surface in $m^2/g$ | — | = | 59.1 | 98.4 |
| oil adsorption in ml/gr | — | = | 1.07 | 1.14 |
| tensile strength in $kp/cm^2$ | 50 | = | 295 | 311 |
| elongation in per cent | 50 | = | 525 | 575 |
| 300 % shear modulus | 50 | = | 2635 | 2500 |
| expansion stiffness in % | 50 | = | 68 | 73 |
| snapback at 100° C | — | = | 56.9 | 50.7 |
| wear loss in gr | — | = | 3.65 | 3.24 |

TABLE IV

Physical and chemical data for rubber and pigment blacks:

| "FROSSRUSS" types of black: | | Type-200 | Type-400 | Type-550 |
|---|---|---|---|---|
| nitrogen surface in $m^2/gr$ | = | 81.8 | 211.2 | 358.9 |
| color intensity in Nigrometer-Index | = | 89 | 71 | 59 |
| oil adsorption in $cm^3/gr$ | = | 1.12 | 1.18 | 1.24 |
| pH-value | = | 7.2 | 6.1 | 3.5 |
| ash content in per cent | = | 0.04 | 0.03 | 0.02 |
| tar content in per cent | = | 0.06 | 0.02 | 0.01 |
| moisture content in per cent | = | 0.38 | 0.23 | 0.12 |

TABLE V

"FROSSRUSS" carbon black types and their characteristics:

| "FROSSRUSS" black type | Adsorption in $I_2$ surface | Adsorption in $N_2$ surface |
|---|---|---|
| Rubber blacks: | | |
| No. 1 = Type 50 | 23.5 $m^2/g$ | 27.5 $m^2/g$ |
| No. 2 = Type 100 | 39.8 $m^2/g$ | |
| No. 3 = Type 150 | 59.1 $m^2/g$ | |
| No. 4 = Type 200 | 76.0 $m^2/g$ | 81.8 $m^2/g$ |
| No. 5 = Type 250 | 98.4 $m^2/g$ | 103.9 $m^2/g$ |
| No. 6 = Type 300 | 130.4 $m^2/g$ | 134.2 $m^2/g$ |
| Pigment blacks: | | |
| No. 7 = Type 350 | 184.8 $m^2/g$ | 188.1 $m^2/g$ |
| No. 8 = Type 400 | 206.0 $m^2/g$ | 211.2 $m^2/g$ |
| No. 9 = Type 450 | 237.3 $m^2/g$ | 241.7 $m^2/g$ |
| No. 10 = Type 500 | 301.5 $m^2/g$ | |
| No. 11 = Type 550 | 351.0 $m^2/g$ | 358.9 $m^2/g$ |
| No. 12 = Type 600 | 398.6 $m^2/g$ | |

Intermediate types between the above grades made under the trademark "FROSSRUSS" can likewise be produced with the apparatus and method of the invention.

ANALYSIS RESULTS FOR TWO KINDS OF BLACK PRODUCED FROM GASEOUS HYDROCARBONS IN ACCORDANCE WITH THE INVENTION

TABLE VI

Analysis of the natural gas used:

| methane | $(CH_4)$ | in % | = 98.30 |
|---|---|---|---|
| ethane | $(C_2H_6)$ | in % | = 1.50 |
| nitrogen | $(N_2)$ | in % | = 0.20 |
| | | | 100.0 |

TABLE VII

Carbon content and heat value of the natural gas used:

In one $Nm^3$ of natural gas, there are:
| carbon in grams | = 547.80 |
|---|---|
| heat value = $H_0$ - $kcal/Nm^3$ | = 9562.00 |

TABLE VIII

| Physical and chemical data: | | Example 1 | Example 2 |
|---|---|---|---|
| $H_2$ surface in $m^2/g$ | = | 240.00 | 490.00 |
| Color intensity | = | 69.50 | 57.00 |
| Moisture in per cent | = | 0.90 | 0.60 |
| pH - value | = | 3.80 | 3.50 |
| Ash content in per cent | = | 0.02 | 0.03 |
| Acetone extract in per cent | = | 0.009 | 0.005 |
| Tar extract in per cent | = | 0.0015 | 0.001 |

From the same natural gas material, still other different "FROSSRUSS" types of carbon black have been produced.

The following table lists useful information on the characteristics of some of the elements of instrumentation of FIG. 1 described rather briefly above in the interest of making clear the operation of the installation and process as a whole.

TABLE IX

| Ref. No. in FIG. 1 | Kind | Characteristics |
|---|---|---|
| 45 | Volume counter | 6 counting drums, summing type Minimum indication 0.1 l |
| Built-in Frequency transmitter | max. range | 1200 l/h |
| 44 | Measurement converter | input signal 4–20mA output 0.2–1 bar |
| 46 | Manometer | input signal 0.2–1 bar scale 0 to 1000kg/h |
| 41 | Flow monitor | max. temp. 150° C switching point adjustable from 0.7–56 l/min. |
| 47 | Ratio relay | linear over 10–1 range scale 0.2:1 to 2.0:1 |
| 48 | Ratio regulator | with control value setting for fixed value, manual-automatic switch, and external control value switch range 7000$m^3$/h (air) |
| 49 | Range regulator | proportional range: 1–500% integrating range: 0.02–50 rpm with built-in cutoff relay for integration stabilization in manual operation. input and output signals: 0.2–1 bar |
| 50 | Pneumatic Drive Damper | Closed when pressure off; spring range 0.6–1.4 bar; with built-in valve regulator and manometer; provided with control disc giving the damper a nearly |

TABLE IX-continued

| Ref. No. in FIG. 1 | Kind | Characteristics |
|---|---|---|
| 58 | Measuring Diaphragm | linear regulator characteristic Insertion length 25mm, between flanges Operating pressure 50mm WS for flow of 7000 Nm 3/h air at 20° C |
| 58 | Pneumatic Differential Pressure transmitter | Range adjustable from 25 to 150 mm WS, fixed at 0–50 mm WS; membrane good for over-pressure to 2 kp/cm$^2$ in both directions Accuracy ±0.5% of the range Feed: 1.4 bar Output signal: 0.2–1 bar |
| 57 | Pneumatic computing relay | Root extraction type, suitable for linearizing the air feed rate signal from transmitter of diaphragm 58 Input and output signals: 0.2–1 bar |
| 56 | Manometer | Scale 0–7000 Nm 3/h Divisions 25 Nm 3/h Input signal: 0.2–1 bar |
| 51 | Throttle Valve Pneumatic Drive | Open when pressure off; electro-pneumatic drive of nearly linear regulation characteristic; built-in limit switch to turn off flower 101 when the damper is closed |
| 69 | Pneumatic Vacuum Meter | Differential pressure transmitter signaling amount of vacuum in chamber 1 Range fixed at −10 to +15 Nm WS (water, static) Other data as for differential pressure transmitter of item 58 |
| 70 | Pneumatic Indicator | Clearly visible indication of desired and actual values of oven under pressure, from −10 to ±5 Nm WS; with desired value transmitter and manual-to-automatic switch built into control console |
| 71 | Pneumatic PID Regulator | Input and output signals: 0.2–1 bar Proportional range: 1–500% adjustable Integrating range: 0.0 to 100 rpm Differential range: 0.01–50 min.; with built-in cutoff relay (in control console) |
| 77, 78 | Damper with Pneumatic Drive | Gate-type throttle value with external roller bearings; open pressure off; with built-in positioning regulator of nearly linear characteristic |

Further combinations of different natural gases have been used for the production of carbon black, for example:

(a) — methane ($CH_4$) = 97.2%; ethane ($C_2H_6$) = 2.1% and nitrogen ($N_2$) = 0.7%, by volume, and
(b) — methane ($CH_4$) = 83.4%; ethane ($C_2H_6$) = 8.6%; propane ($C_3H_8$) = 3.2%; butane ($C_4H_{10}$) = 0.7%; pentane ($C_5H_{12}$) = 0.01% and nitrogen ($N_2$) = 4.0%, by volume.

Given below are the results of two measurements in which air was used as the oxygen-containing gas. For the production of one kilogram of carbon black there were needed:

Type 200: 10.2 Nm$^3$ of air and 2.4 kg of heavy oil i.e. 4.25 Nm$^3$ per kg of heavy oil
Type 400: 25.4 Nm$^3$ of air and 4.3 kg of heavy oil i.e. 5.9 Nm$^3$ per kg of heavy oil.

For the complete combustion of the heavy oil according to the above-mentioned analysis, 10.27 Nm$^3$ of air per kg of heavy oil would be necessary, so that the amount of air supplied in the above instances is:

Type 200: about 41%
Type 400: about 57.5% of the minimum amount of air needed for the complete combustion of the heavy oil.

It is observable from the residual gas analysis that approximately 9 to 11% by volume of $CO_2$ and approximately 6 to 7% by volume of CO are the largest components, whereas the $H_2$, $CH_4$ and $C_mH_n$ components (heavy hydrocarbons) are substantially smaller and amount to only a few percent.

The essentials of the process here described stand out clearly from these two experiments. According to the adjustment of the oil-air ratio that is chosen, a particular quality of carbon black can be produced in a reproducible way. The finer the carbon black quality is to be, the greater must be the proportion of the air in the mixture. Thus, for the pigment quality carbon black Type 400 the required air amounts to 1.4 times the air requirements for the rubber-compounding quality of carbon black, Type 200. The portion of the heavy oil that is not converted into carbon black is burned and serves to maintain the reaction temperature in the combustion chamber.

By the conditioning of the heavy oil and of the air before introduction into the combustion chamber and by the regulation of the oven input and output it is possible to obtain continuous operation and constant maintenance of the reaction conditions in the combustion chamber without the necessity of adding a carrier gas, of providing quenching with a water stream or other supplementary means.

It is also possible to interrupt the production of carbon black at any time and to start it up again at any desired time with the same output quality or some other output quality without the time-consuming preparatory labors previously necessary. After the warming-up period previously mentioned, the production of carbon black can immediately thereafter be resumed. In the production installations of the type here described there is practically no limitation with reference to the variation of the quality of the carbon black output.

I claim:

1. Method for production of carbon black from lqiuid hydrocarbon material in the presence of a free-oxygen-containing air-like gas by thermal decomposition of the hydrocarbon material through partial combustion thereof in a hot reaction chamber having an entry end and an exit end at opposite ends of a straight axis through the chamber, the hot condition of which chamber is maintained mainly by said partial combustion, comprising the steps of:

pressurizing said liquid hydrocarbon material and preheating it;

preheating said free-oxygen-containing gas;

distributing and injecting said pressurized and preheated liquid hydrocarbon material in a finely divided state into, and passing it in an axial direction through, a plurality of ante-chambers open to said reaction chamber at the entry end of the latter and having their axes substantially parallel to said axis of said reaction chamber, and vaporizing said hydrocarbon material during its passage through said ante-chambers, said ante-chambers being substantially evenly distributed over said entry end of said reaction chamber;

distributing said preheated free-oxygen-containing gas to all said ante-chambers and passing said gas axially through said ante-chambers while mixing said gas with said hydrocarbon material therein to form a reagent mixture in said ante-chambers;

heating the said reagent mixture without ignition thereof in said ante-chambers directly by heat produced in said reaction chamber so that the temperature of said ante-chambers is above 600° C.;

passing essentially only said reagent mixture into said reaction chamber and decomposing said hydrocarbon material downstream from said ante-chambers in said reaction chamber to form carbon black, by a reaction which reaction includes partially burning said hydrocarbon material there at a temperature between 950° and 1200° C.;

passing the reaction products out of the reaction chamber at its exit end and then immediately cooling the reaction products by indirect heat exchange in successive first and second steps, said second cooling step serving to preheat at least a portion of said oxygen-containing gas and said first cooling step utilizing a cooling medium of which the flow is regulated so as to provide a temperature of said reaction products such as to quench the carbon black forming reaction after the performance of the first of said cooling steps but still sufficiently high to preheat the oxygen-containing gas in the second cooling step, and separating carbon black from the gaseous reaction products.

2. Method according to claim 1, in which said free-oxygen-containing gas is passed through a distribution chamber (63) mounted on a head wall at said entry end of said reaction chamber and is there preheated by heat derived from carbon black forming reaction passing through said head wall.

3. Method according to claim 1, in which said liquid hydrocarbons consist essentially of heavy petroleum oil.

4. Method according to claim 1, in which the supply of liquid hydrocarbon material and the supply of said oxygen-containing gas to said reaction chamber are regulated to maintain a predetermined oil-gas ratio, and in which method there is also performed the preliminary step of selecting said predetermined oil-gas ratio by reference to the types of product respectively producible by the method with a variety of particular oil-gas ratios.

5. Method according to claim 1, in which the temperature in the reaction chamber is held between 950° and 1200° C. by sensing said temperature, supplying additional heat to the reaction chamber when the temperature therein approaches 950° C. and providing removal of heat from the reaction chamber when the temperature therein approaches 1200° C.

6. Method according to claim 5, in which the supplying of additional heat or the provision of removal of heat respectively to and from the reaction chamber is carried out so as to maintain the temperature therein at approximately 1100° C.

7. Method according to claim 1, which also comprises the additional steps of (a) removing the residual gas mixture remaining after the step of separating the reaction products, in a manner providing suction, (b) sensing the pressure in the reaction chamber and (c) controlling the suction provided by removal of said residual gas mixture so as to regulate the pressure so sensed.

8. Method according to claim 1, in which there is provided a preliminary step of initial warm-up from a cold start in which step a fuel is burned in a warm-up heater with the resulting combustion products passing into said reaction chamber, and in which method there is also performed the step of removing the gas mixture passed out of the reaction chamber during said initial warm-up step by removing at least a part of said gas mixture through a path of which a portion puts said gas mixture in warming contact with equipment for delivering the separated carbon black, thereby warming up said delivery equipment, and the further step, after the conclusion of said initial warm-up step, of removing the residual gas mixture remaining after the step of separating the reaction products without passage of any part thereof through said path.

9. Method for production of carbon black from normally gaseous hydrocarbon material in the presence of a free-oxygen-containing air-like gas by thermal decomposition of the said hydrocarbon material through partial combustion in a hot reaction chamber having an entry end and an exit end at opposite ends of a straight axis through the chamber, the hot condition whereof is maintained mainly by said partial combustion, comprising the steps of:

controllably pressurizing said hydrocarbon material;

controllably pressurizing said free-oxygen-containing gas;

supplying said pressurized hydrocarbon material and said pressurized free-oxygen-containing gas in a mixing chamber to form a mixed reagent gas;

preheating said mixed reagent gas;

distributing said preheated and mixed reagent gas into, and passing it in an axial direction through, a plurality of ante-chambers open to said reaction chamber at the entry end of the latter and having their axes substantially parallel to the axis of said reaction chamber, said ante-chambers being substantially evenly distributed over said entry end of said reaction chamber;

heating said reagent mixture without ignition thereof in said ante-chambers directly by heat produced in said reaction chamber so that the temperature of said ante-chambers is above 600° C.;

passing essentially only said reagent mixture into said reaction chamber and decomposing said hydrocarbon material downstream of said antechambers to form carbon black in said reaction chamber by a reaction which includes partially burning said hydrocarbon material at a temperature between 950° and 1200° C.;

passing the reaction products out of the reaction chamber at its exit end; cooling the resulting reaction products immediately after they leave said reaction chamber by transfer of heat through a first heat exchange partition to a cooling medium stream, and further cooling the reaction products immediately after said first cooling step by transfer of heat through a second heat exchange partition of a stream of said mixed reaction gas being thereby preheated;

controlling the flow of cooling medium in the first cooling step substantially so as to provide a temperature of said reaction products such as to quench the carbon black forming reaction after the performance of the first of said cooling steps but still sufficiently high to preheat the oxygen-containing gas in the second cooling step, and separating the reaction products, immediately after cooling, into a residual gas mixture and solids consisting essentially of carbon black.

10. Method according to claim 9, in which the step of separating the reaction products is followed by removing the residual gas mixture by controlled suction in such a manner as to controllably adjust the pressure in said combustion chamber to a desired pressure range.

11. Method according to claim 9, in which the free-oxygen-containing gas is air and in which the proportion of hydrocarbon gas and air mixed in the mixing chamber is in the range of 4 1 to 6 parts of air per part of hydrocarbon gas.

12. Method according to claim 9, in which the step of supply of gaseous hydrocarbon and the rate of supply of said free-oxygen-containing gas mixture are regulated by control of the relative amounts of gaseous hydrocarbons and of free-oxygen-containing gas mixture in said mixing chamber to maintain a predetermined hydrocarbon-oxygen ratio, and in which method there is also performed the preliminary step of selecting said predetermined hydrocarbon-to free-oxygen ratio by reference to the types of product respectively producible by the method with a variety of particular hydrocarbon-to-free oxygen ratios.

13. Method according to claim 9, in which the step of supplying said hydrocarbon material and said free-oxygen-containing gas to said mixing chamber is carried out by passing each through an individual pressure stabilizing chamber after reducing the pressure and before controlling the mixing ratio, and then controlling the mixing ratio by separate valving, and in which the mixing step includes passing the partially mixed reaction gas through a homogenizing path.

14. Method according to claim 9, in which the temperature of the reaction chamber is held between 950° and 1200° C. by sensing the temperature in said reaction chamber, supplying additional heat to the reaction chamber when the temperature therein approaches 950° C. and providing additional removal of heat from the reaction chamber when the temperature therein approaches 1200° C.

15. Method according to claim 14, in which the supplying of additional heat or the provision of additional removal of heat respectively to and from the reaction chamber is carried out so as to maintain the temperature therein at approximately 1100° C.

16. Method according to claim 9, in which there is provided a preliminary step of initial warm-up from a cold start in which step a fuel is burned in a warm-up heater with the resulting combustion products passing into said reaction chamber, whereby said reaction chamber is brought up to a temperature at which said mixed reaction gas will, when introduced therein through said ante-chambers, undergo partial combustion in said reaction chamber and furnish heat for maintaining thereafter the partial combustion reaction.

17. Method according to claim 16, which also comprises the additional steps of (a) removing the residual gas mixture remaining after the step of separating the reaction products, in a manner providing suction (b) sensing the pressure in the furnace chamber and (c) controlling the suction provided by removal of said residual gas mixture so as to regulate the pressure so sensed.

18. Method according to claim 4 in which the step of regulating the supply of liquid hydrocarbon material and the supply of said oxygen-containing gas to said reaction chamber to maintain a predetermined oil-gas ratio is performed by supplying said liquid hydrocarbon material to said reaction chamber at a convenient rate, continuously measuring said rate and using the measurement thereof as an input to a ratio regulator (48), controlling a variable constriction in a supply duct for said oxygen-containing gas by means of said ratio regulator and improving the accuracy of the control of the flow of said oxygen-containing gas by said ratio regulator by measuring the flow of said gas at a point downstream of said constriction and utilizing the measurement thereby provided for correction of control of said constriction by said ratio regulator.

* * * * *